(12) United States Patent
DePena, II

(10) Patent No.: US 11,484,150 B2
(45) Date of Patent: Nov. 1, 2022

(54) PORTABLE OPEN FLAME AND CHARCOAL GRILL

(71) Applicant: Bolivar J. DePena, II, San Antonio, TX (US)

(72) Inventor: Bolivar J. DePena, II, San Antonio, TX (US)

( * ) Notice: Subject to any disclaimer, the term of this patent is extended or adjusted under 35 U.S.C. 154(b) by 173 days.

(21) Appl. No.: 16/831,771

(22) Filed: Mar. 26, 2020

(65) Prior Publication Data

US 2021/0298525 A1    Sep. 30, 2021

(51) Int. Cl.
*A47J 37/07* (2006.01)

(52) U.S. Cl.
CPC ....... *A47J 37/0718* (2013.01); *A47J 37/0763* (2013.01)

(58) Field of Classification Search
CPC .......................... A47J 37/0718; A47J 37/0763
See application file for complete search history.

(56) References Cited

U.S. PATENT DOCUMENTS

| | | | | |
|---|---|---|---|---|
| 5,094,223 A | * | 3/1992 | Gonzalez | F24B 15/005 126/41 R |
| 5,203,316 A | * | 4/1993 | Pritchett | E04H 15/26 126/30 |
| 5,598,834 A | * | 2/1997 | Grady | F24B 1/181 126/506 |

* cited by examiner

*Primary Examiner* — Alfred Basichas
(74) *Attorney, Agent, or Firm* — Kammer Browning PLLC

(57) ABSTRACT

A dual purpose outdoor device that combines the benefits of a portable fire pit that allows the construction of an open fire of charcoal or wood on the ground or just above the ground, with a portable grill that allows for cooking food over a wood or charcoal fire. The device has upper and lower fire chambers, top and bottom lids, and an adjustable ancillary ring shaped grill and grill cover. Latches on the components and lids allow the device to be closed and transported and/or to be used for storage of utensils and grilling accessories.

16 Claims, 6 Drawing Sheets

(A - A')

(B - B')

Top and Ancillary/External Outer Grill View

External/Auxiliary/Outer Grill Adjustable Heat & Air

PORTABLE OPEN FLAME AND CHARCOAL GRILL

BACKGROUND OF THE INVENTION

1. Field of the Invention

The present invention relates generally to outdoor fire pits and charcoal grills. The present invention relates more specifically to a portable, dual purpose, fire enclosure and food grilling device.

2. Description of the Related Art

Portable fire pits that allow for the outdoor construction of an open fire of charcoal or wood on the ground or just above the ground are known. Portable outdoor grills that allow for cooking food over a wood or charcoal fire are also known. The structures of most portable fire pits do not allow for easy the easy grilling of food. Likewise, most portable grills do not permit the user to enjoy the benefits of an open fire pit. It would be desirable to have a single device that could alternate between an open flame fire pit or enclosure and a wood or charcoal grill.

SUMMARY OF THE INVENTION

The present invention provides a dual purpose outdoor device that combines the benefits of a portable fire pit that allows the construction of an open fire of charcoal or wood on the ground or just above the ground, with a portable grill that allows for cooking food over a wood or charcoal fire. The device has upper and lower fire chambers, top and bottom lids, and an adjustable ancillary ring shaped grill and grill cover. Latches on the components and lids allow the device to be closed and transported and/or to be used for storage of utensils and grilling accessories.

DETAILED DESCRIPTION OF THE PREFERRED EMBODIMENTS

Figure 1:
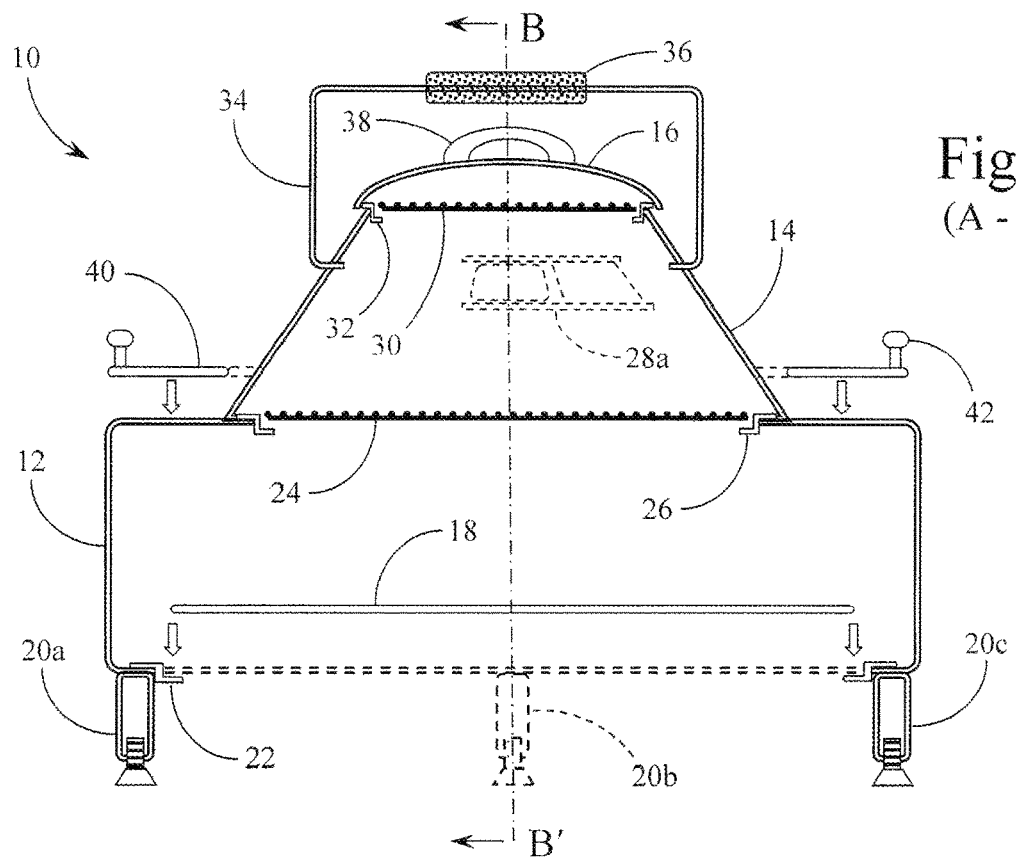
FIG. 1 is a partial cross-sectional view (Section Line A-A' in FIG. 3) of the portable fire pit and grill of the present invention.

Reference is made first to FIG. 1 which is a partial cross-sectional view (Section Line A-A' in FIG. 3) of the portable fire pit and grill of the present invention. In this view, portable fire pit and grill 10 is seen to be constructed of three primary separable components: flame baffle chamber 12; charcoal baffle chamber 14; and top cover 16. Additional grills, handles, and covers fit to the three primary components as described in more detail below.

Flame baffle chamber 12 is the base of the overall structure with generally closed side walls and an opening on top and on the bottom. The chamber 12 is supported on adjustable legs 20a-20c which preferably include threaded feet as shown in FIG. 1. The perimeter of the bottom opening of chamber 12 incorporates bottom lid supports 22 which are fixed on the edge of the opening and are positioned to receive and support bottom lid 18. Bottom lid 18 is generally used to close chamber 12 for storage and transport of the portable fire pit and grill 10 and is typically removed during use of the portable fire pit and grill. Removal of the bottom lid 18 allows the portable fire pit and grill 10 to be placed over a wood or coal fire that has been constructed on the ground. Alternately, if the grill is to be used with charcoal as described in more detail below, the removal of bottom lid 18 provides the necessary airflow into the chamber 12 from below the portable fire pit and grill 10 as between the adjustable legs 20a-20c.

Charcoal baffle chamber 14 is sized and structured to fit on top of flame baffle chamber 12 as shown in FIG. 1. The perimeter of the top opening of chamber 12 incorporates charcoal grill supports 26 which are fixed on the edge of the opening and are positioned to receive and support charcoal grill 24. The lower opening of the conical shaped charcoal baffle chamber 14 is sized to sit on top of flame baffle chamber 12 and is centered by resting just outside the charcoal grill supports 26. The conical walls of charcoal baffle chamber 14 include one or more (preferably two) adjustable vents 28a-28b. The perimeter of the smaller top opening of charcoal baffle chamber 14 incorporates top food grill supports 32 which are fixed on the edge of the opening and are positioned to receive and support top food grill 30. The upper opening of the conical shaped charcoal baffle chamber 14 is sized to receive top food grill 30 and top cover 16. Top cover 16 is centered over the upper opening of charcoal baffle chamber 14 by resting just outside the top food grill supports 32. Top cover 16 is set in place and/or removed using low heat conducting handle 38. Charcoal baffle chamber 14 is likewise set in place and/or removed from flame baffle chamber 12 using top chamber handle 34 fitted with low heat conducting grip 36 as shown in FIG. 1.

Figure 2:
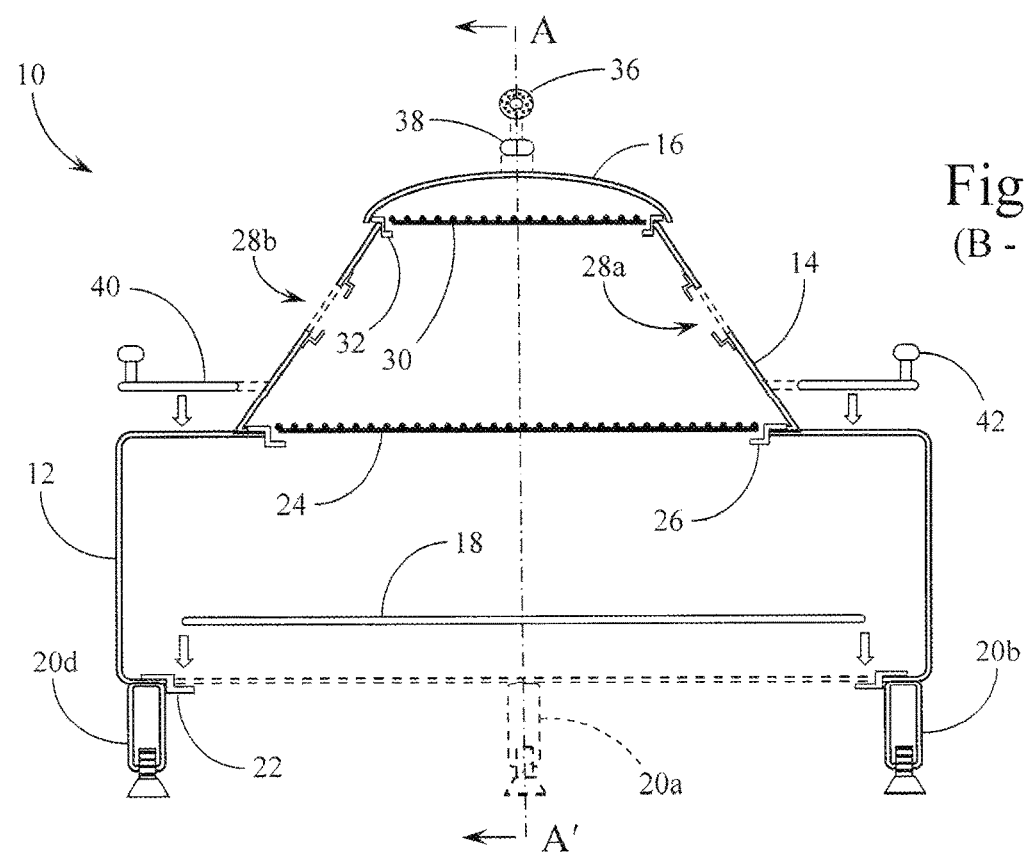
FIG. 2 is a partial cross-sectional view (Section Line B-B' in FIG. 3) of the portable fire pit and grill of the present invention.
Figure 3:
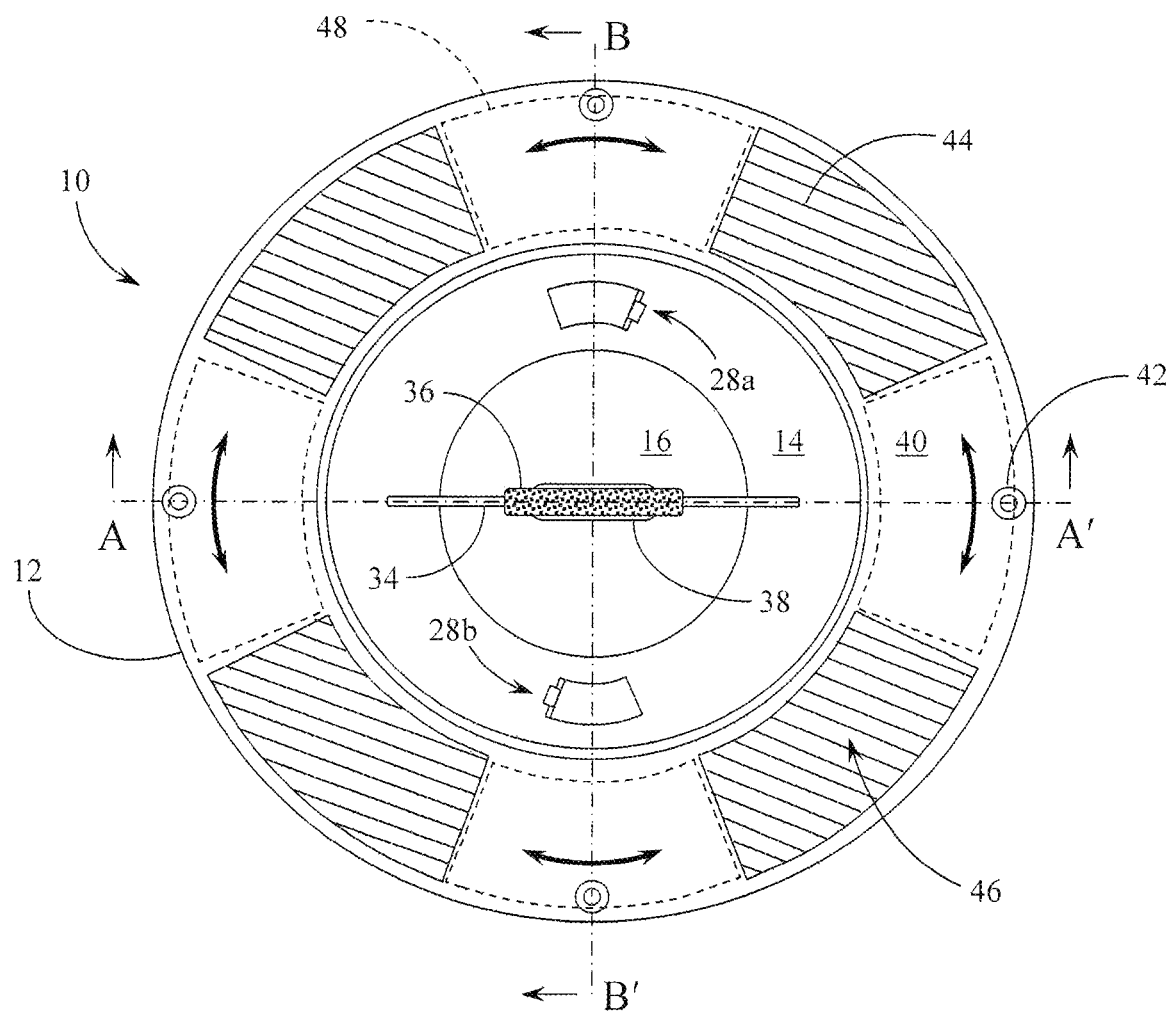
FIG. 3 is a top plan view of the portable fire pit and grill of the present invention.

Seen best in FIG. 3, ancillary food grill and adjustment cover 40 is shown in FIG. 1 elevated from its position on top of flame baffle chamber 12, concentric with and peripheral to charcoal baffle chamber 14. One or more adjustment handles 42 are fixed to ancillary food grill and adjustment cover 40 to allow for the sliding rotation of the ring shaped structure over the partially open top of flame baffle chamber 12. The structure and function of ancillary food grill and adjustment cover 40 is described in more detail below. Not seen in the particular cross-sectional orientation of FIG. 1 (or in the orthogonal orientation of FIG. 2) are grill segments 44 (seen from above in FIG. 3). Each grill segment 44 is positioned into arch segment openings peripherally positioned in the top of flame baffle chamber 12. These grill segments are supported with grill supports similar to the charcoal grill supports 26 shown in FIG. 1. Alternately, these grill segments 44 may be permanently fixed (welded, for example) to the underside of the top of flame baffle chamber 12, as long as they do not interfere with the free-sliding rotation of adjustment cover 40 over the top of chamber 12.

Reference is next made to FIG. 2 which is a partial cross-sectional view (Section Line B-B' in FIG. 3) of the portable fire pit and grill of the present invention. In this view, orthogonal to that show in FIG. 1, portable fire pit and grill 10 is again seen to be constructed primarily of flame baffle chamber 12; charcoal baffle chamber 14; and top cover 16. Flame baffle chamber 12 is supported on adjustable legs 20a-20c. The bottom opening of chamber 12 receives and support bottom lid 18.

Charcoal baffle chamber 14 fits on top of flame baffle chamber 12 as shown in both FIGS. 1 & 2. The lower opening of the conical shaped charcoal baffle chamber 14 is sized to sit on top of flame baffle chamber 12 and is centered by resting just outside the charcoal grill supports 26. Charcoal grill supports 26 may include latches (not shown) that operate with mating latch components (not shown) on charcoal baffle chamber 14 to secure the charcoal baffle chamber to the flame baffle chamber, especially during transport and/or storage. Such latching components may preferably be press-fit type latches or rotating bayonet type latches. Once again, the conical walls of charcoal baffle chamber 14 preferably include adjustable vents 28a & 28b. The upper opening of the conical shaped charcoal baffle chamber 14 is sized to receive top food grill 30 and top cover 16 on top food grill supports 32. Top food grill supports 32 may include latches (not shown) that operate with mating latch components (not shown) on top cover 16 to secure the top cover to the charcoal baffle chamber, especially during transport and/or storage. Such latching components may preferably be press-fit type latches or rotating bayonet type latches. Top cover 16 is handled using low heat conducting handle 38 and charcoal baffle chamber 14 is handled using top chamber handle 34 fitted with low heat conducting grip 36.

Once again, ancillary food grill and adjustment cover 40 is shown in FIG. 2 elevated from its position on top of flame baffle chamber 12, concentric with and peripheral to charcoal baffle chamber 14. The structure and function of ancillary food grill and adjustment cover 40 is best described in connection with the top view of FIG. 3. The orthogonal views of FIGS. 1 & 2 convey the preferred number of four adjustable legs 20; four bottom lid supports 22; four charcoal grill supports 26; four top food grill supports; four adjustment handles 42; and two adjustable vents 28. However, those skilled in the art will recognize that fewer or more of these components could function as well for their intended purposes.

Reference is next first to FIG. 3 which is a top plan view of the portable fire pit and grill of the present invention. Section Line A-A' in FIG. 3 defines the view of FIG. 1 and Section Line B-B' in FIG. 3 defines the view of FIG. 2. In the top plan view of FIG. 3, portable fire pit and grill 10 is again seen to be constructed of three primary stacked components: flame baffle chamber 12 (the outer edge of which is visible in FIG. 3); charcoal baffle chamber 14 (the sloped walls of which are visible in FIG. 3); and top cover 16. Flame baffle chamber 12 is generally hidden in the view of FIG. 3 although the top of chamber 12, being a combination of solid segments 48 (shown in broken line) and open grill segments 44, is shown supporting ancillary food grill and adjustable cover 40.

Once again, charcoal baffle chamber 14 is sized and structured to fit centered on top of flame baffle chamber 12 as shown in each of the FIGS. 1-3. The perimeter of the top opening of chamber 12 incorporates charcoal grill supports (not seen in FIG. 3) which are fixed on the edge of the opening and are positioned to center the lower opening of the conical shaped charcoal baffle chamber 14 by resting just outside the charcoal grill supports. The conical walls of charcoal baffle chamber 14 include two adjustable vents 28a & 28b. The upper opening of the conical shaped charcoal baffle chamber 14 is sized to receive top cover 16. Top cover 16 is centered over the upper opening of charcoal baffle chamber 14 by resting just outside the top food grill supports (not seen in FIG. 3). Top cover 16 is set in place and/or removed using low heat conducting handle 38. Charcoal baffle chamber 14 is likewise set in place and/or removed from flame baffle chamber 12 using top chamber handle 34 fitted with low heat conducting grip 36 as shown.

FIG. 3 shows the full structure of ancillary food grill and adjustment cover 40 positioned on top of flame baffle chamber 12, concentric with and peripheral to charcoal baffle chamber 14. Adjustment handles 42 (four in the embodiment shown) are fixed to ancillary food grill and adjustment cover 40 to allow for the sliding rotation (see double ended motion arrows) of the ring shaped structure over the partially open top of flame baffle chamber 12. Ancillary food grill and adjustment cover 40 is generally a flat ring shaped panel whose outside diameter is about the same as that of the flame baffle chamber 12 and whose inside diameter is slightly larger than the outside diameter of the lower opening of the conical shaped charcoal baffle chamber 14. The ring shaped panel has arc section cutouts 46 (four in the embodiment shown) that expose portions of the top of flame baffle chamber 12, the top being a combination of solid segments 48 (shown in broken line) and open grill segments 44. The rotational position of adjustment cover 40 in FIG. 3 is such as to fully expose the grill segments 44. Rotation of the adjustment cover 40 by 45° in either direction would close off the grill segments 44 and expose only the solid surfaces of the top of flame baffle chamber 12.

In the above manner, ancillary food grill and adjustment cover 40 provides a versatile additional grilling surface or a heated flat surface to warm (or keep warm) pots and/or skillets that need not be directly over hot coals or flames from the contained fire. The ancillary food grill and adjustment cover 40 may be used with or without charcoal baffle chamber 14 in place.

Many different configurations and uses of the portable fire pit and grill of the present invention are anticipated. A wood fire (or charcoal in some circumstances) may be built on the ground and the flame baffle chamber 12 may be placed over it. If the fire is only to be enjoyed as a camp fire, the center top of the chamber 12 may simply be left open with the adjustment cover 40 being opened or closed. If the wood fire is to be cooked over, grill 24 may be placed over the center top of the chamber 12, again with the adjustment cover 40 being opened or closed depending on how much grill space is required. With this type of grilling surface, charcoal baffle chamber 14 may be used as a chimney (with top cover 16 removed) or as a grill cover (with top cover 16 in place). Top food grill 30 may be utilized or not in these latter two ground fire configurations.

Portable fire pit and grill 10 of the present invention may also be used as an above ground grill with flame baffle chamber 12 serving to elevate a bed of charcoal positioned on charcoal grill 24. Although generally started with lighter fluid or the like it is possible to start a bed of charcoal positioned on charcoal grill 24 from below with a previously built ground fire inside of flame baffle chamber 12. Typically, however, chamber 12 serves as only an airflow channel for the bed of charcoal positioned on grill 24. Cooking of food is carried out primarily on top food grill 30 in this configuration with the sloped walls of charcoal baffle chamber 14 serving to focus the heat of the coals on the smaller top food grill 30. Although not heated to the same extent as with an enclosed ground fire, the ancillary food grill and adjustment cover 40 may still be used in an open or closed condition.

Figure 4:
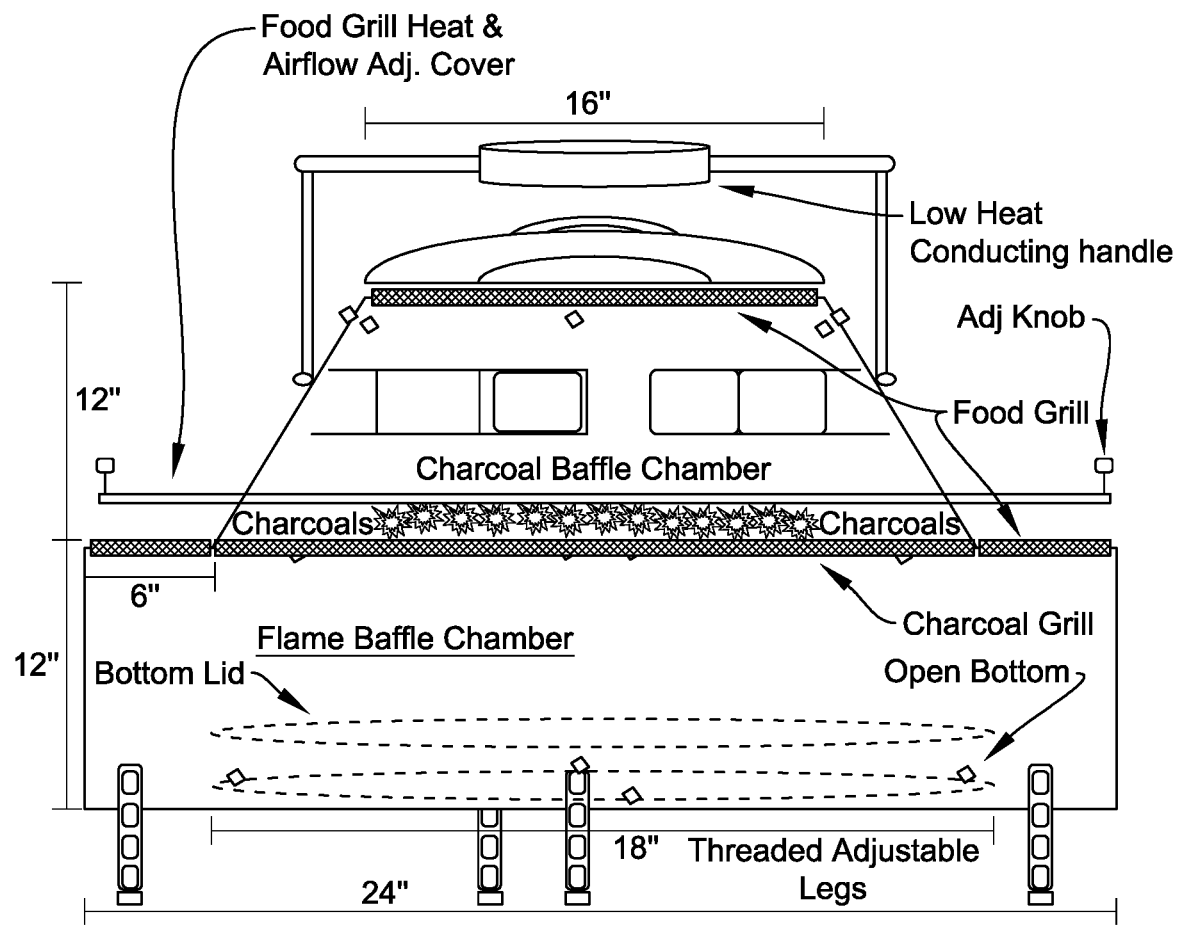
FIG. 4 is a schematic elevational side view of an alternate embodiment of the portable fire pit and grill of the present invention.
Figure 5:
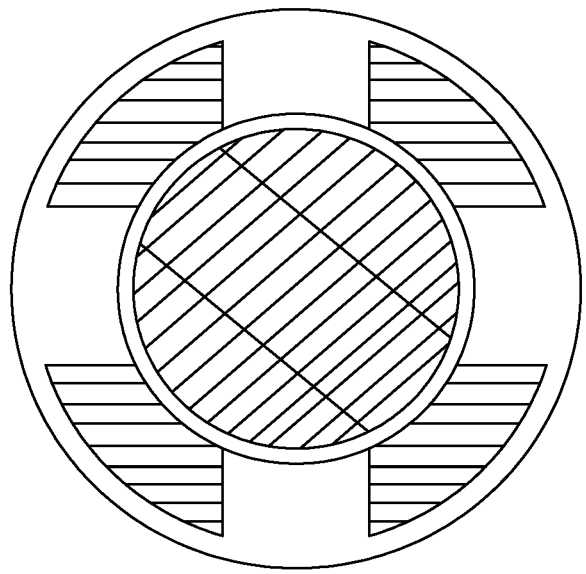
FIG. 5 is a top plan view of the top and ancillary external outer grill of the portable fire pit and grill of the present invention.
Figure 6:
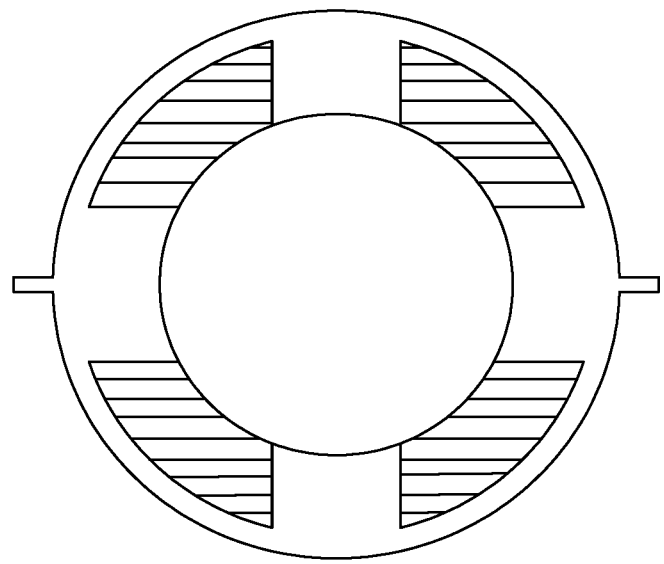
FIG. 6 is a top plan view of the ancillary external outer grill adjustable heat and airflow component of the portable fire pit and grill of the present invention.

FIG. 4 is a schematic elevational side view of one preferred embodiment of the portable fire pit and grill of the present invention. FIG. 5 is a top plan view of an alternate embodiment of the top and ancillary external outer grill of the portable fire pit and grill of the present invention. FIG. 6 is a top plan view of an alternate embodiment of the ancillary external outer grill adjustable heat and airflow component of the portable fire pit and grill of the present invention.

Figure 7:
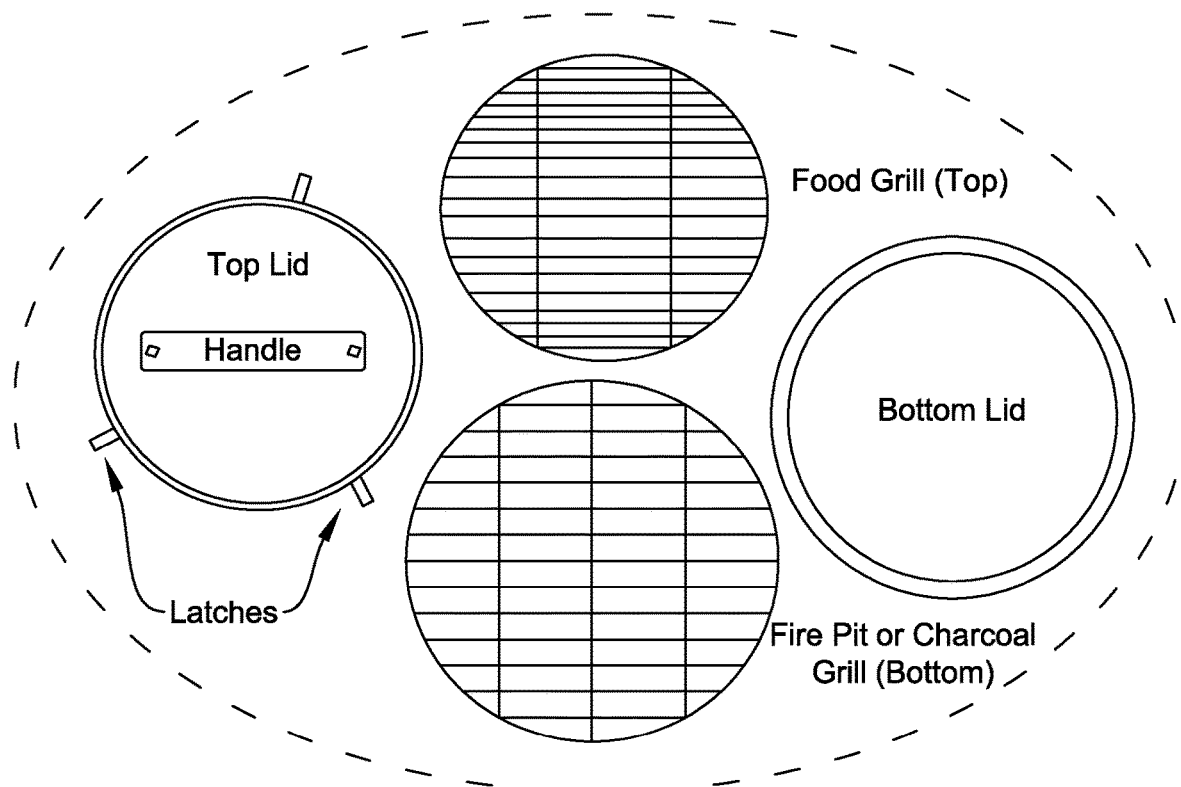
FIG. 7 is a top plan view of the various additional components of the portable fire pit and grill of the present invention.
Figure 8:
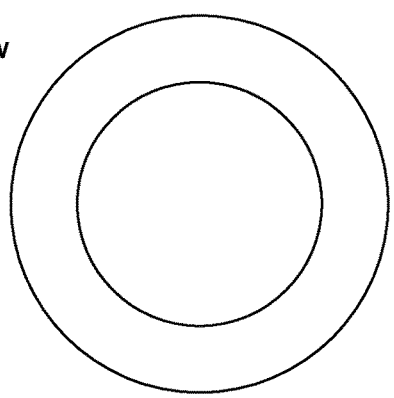
FIG. 8 is a top plan view of the food grill heat and airflow adjustment cover of the portable fire pit and grill of the present invention.

FIG. 7 is a top plan view of the various additional components of the portable fire pit and grill of the present invention. FIG. 8 is a top plan view of an alternate embodiment of the food grill heat and airflow adjustment cover of the portable fire pit and grill of the present invention.

Figure 9:
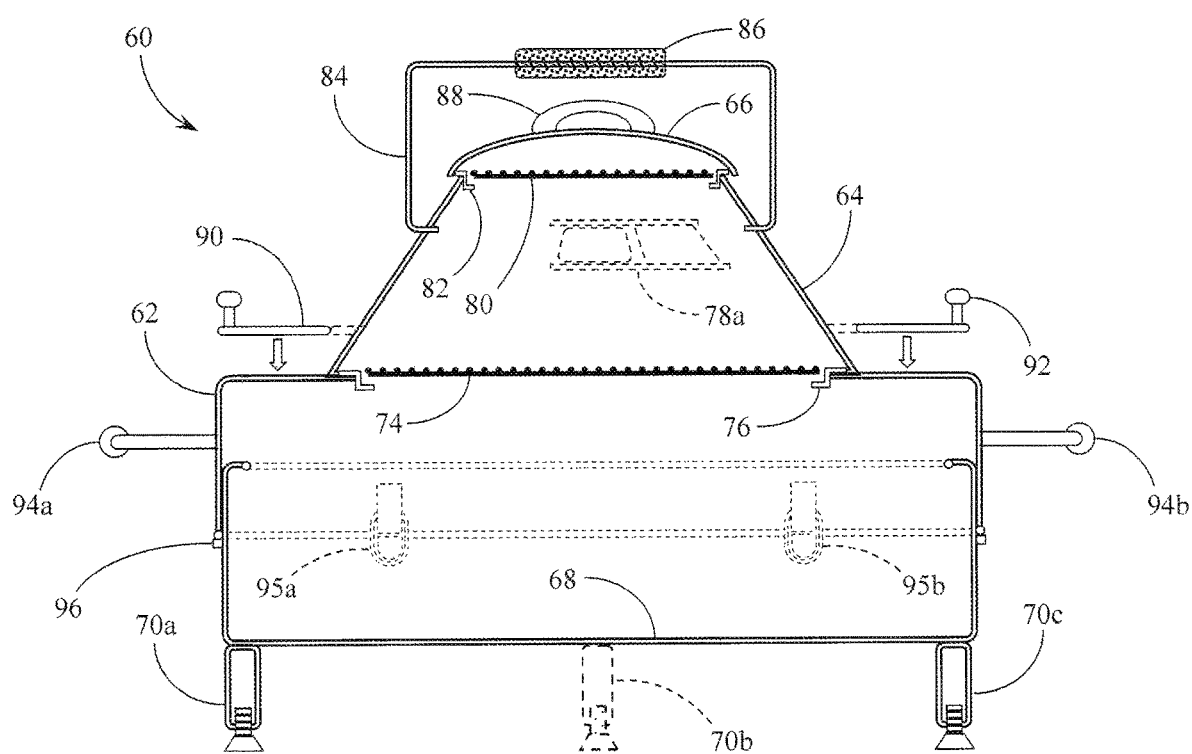
FIG. 9 is a partial cross-sectional view of an alternate embodiment of the portable fire pit and grill of the present invention.

Reference is finally made to FIG. 9 which is a partial cross-sectional view of an alternate embodiment of the portable fire pit and grill of the present invention. In this view, portable fire pit and grill 60 is seen to be constructed of four primary separable components: base chamber 68; flame baffle chamber 62; charcoal baffle chamber 64; and top cover 66. In this embodiment, flame baffle chamber 62 fits over base chamber 68 with the open lower edge of flame baffle chamber 62 fitting over the side walls of base chamber 68, supported on fixed ridge 96. Latches 95*a* & 95*b* secure the chamber shells 62 & 68 together for transport and storage. Handles 94*a* & 94*b* are fixed to the sides of flame baffle chamber 62 to lift the chamber off and on to base chamber 68. In this embodiment, base chamber 62 acts essentially as an above ground fire pit over which the balance of the assembly may be placed. Alternately, flame baffle chamber 62 may be lowered over a simple ground level fire ring of the same or slightly smaller diameter to achieve a similar functionality.

The base chamber 68 is preferably supported on adjustable legs 70*a*-70*c* which preferably include threaded feet as shown in FIG. 9. Charcoal baffle chamber 64 is sized and structured to fit on top of flame baffle chamber 62 as shown in FIG. 9. The perimeter of the top opening of chamber 62 incorporates charcoal grill supports 76 which are fixed on the edge of the opening and are positioned to receive and support charcoal grill 74. The lower opening of the conical shaped charcoal baffle chamber 64 is sized to sit on top of flame baffle chamber 62 and is centered by resting just outside the charcoal grill supports 76. The conical walls of charcoal baffle chamber 64 include one or more (preferably two) adjustable vents 78*a*-78*b*. The perimeter of the smaller top opening of charcoal baffle chamber 64 incorporates top food grill supports 82 which are fixed on the edge of the opening and are positioned to receive and support top food grill 80. The upper opening of the conical shaped charcoal baffle chamber 64 is sized to receive top food grill 80 and top cover 66. Top cover 66 is centered over the upper opening of charcoal baffle chamber 64 by resting just outside the top food grill supports 82. Top cover 66 is set in place and/or removed using low heat conducting handle 88. Charcoal baffle chamber 64 is likewise set in place and/or removed from flame baffle chamber 62 using top chamber handle 84 fitted with low heat conducting grip 86 as shown in FIG. 9.

Ancillary food grill and adjustment cover 90 is shown in FIG. 9 elevated from its position on top of flame baffle chamber 62, concentric with and peripheral to charcoal baffle chamber 64. One or more adjustment handles 92 are fixed to ancillary food grill and adjustment cover 90 to allow for the sliding rotation of the ring shaped structure over the partially open top of flame baffle chamber 62.

The components of the present invention are preferably made of lightweight or heavy gage metal with stainless steel or ceramic coated grills. As indicated above, the system can be used on top of open flames, or with tinder or charcoal. The system provides an enclosed design that allows the user to easily start the fire, serves to shield the fire from wind, evenly distributes heat within the chambers and to the grills, reduces the amount of charcoal needed, and is significantly safer to be around, especially for children.

Sets of adjustable vents are positioned on the lids or tops of the upper baffle chamber and lower baffle chamber that control airflow and heat temperature and help smother or put out the fire or charcoals when closed. The top lid with multiple handles may be provided with latches for easy carrying and storage. The closed system can be used for storing such materials as charcoal, lighter fluid, cooking utensils, etc. The removable bottom lid may also be provided with latches to be used while carrying the device and for additional storage. As mentioned above, the removable bottom lid may also be used as a safety bottom when charcoal grilling where ground fires are not wanted. Removal of the bottom lid provides ease of cleaning after use with charcoal. Once again, the bottom lid is typically removed when flame grilling. Adjustable legs on the flame baffle chamber help level and stabilize the device on uneven surfaces.

Although the present invention has been described in conjunction with a number of preferred embodiments, those skilled in the art will recognize modifications to these embodiments that still fall within the spirit and scope of the invention as best characterized by the following claims.

I claim:

1. A portable combination fire pit and grill that alternately allows for the construction of an open fire of charcoal and/or wood, or the cooking of food over an enclosed wood or charcoal fire, the combination pit and grill comprising:
    a lower fire chamber having generally closed side walls, a partially open bottom, and a partially open top;
    an upper fire chamber having tapered side walls, a generally open bottom, and a generally open top, the generally open bottom of the upper fire chamber sized to generally cover the partially open top of the lower fire chamber;
    a removable lid sized to cover and close the generally open top of the upper fire chamber;
    a bottom closure panel sized to cover and close the partially open bottom of the lower fire chamber;
    a first grill panel sized to cover the partially open top of the lower fire chamber, the first grill panel positioned between the lower and upper fire chambers; and
    a second grill panel sized to cover the generally open top of the upper fire chamber, the second grill panel positioned between the upper fire chamber and the removable lid.

2. The combination fire pit and grill of claim 1 wherein the partially open top of the lower fire chamber comprises a radial array of arc segment apertures, each arc segment aperture including a supported grill arc segment inside the aperture.

3. The combination fire pit and grill of claim 2 wherein the first and second grill panels, and the grill arc segments are constructed of stainless steel.

4. The combination fire pit and grill of claim 2 further comprising an adjustable ancillary food grill cover, the ancillary cover comprising a flat ring shaped panel having a radial array of arc segment apertures sized and positioned to alternately align with or misalign with the radial array of arc segment apertures in the partially open top of the lower fire chamber.

5. The combination fire pit and grill of claim 4 wherein the adjustable ancillary food grill cover further comprises at least one adjustment handle allowing the user to direct the sliding rotation of the ancillary food grill cover over the top of the lower fire chamber.

6. The combination fire pit and grill of claim 1 wherein the lower fire chamber further comprises a plurality of adjustable legs to support the chamber and variably distance the device from a ground surface on which the device is positioned.

7. The combination fire pit and grill of claim 1 wherein the upper fire chamber further comprises at least one adjustable vent in the side walls of the chamber.

8. The combination fire pit and grill of claim 1 wherein the upper fire chamber further comprises a loop handle secured to the side walls of the chamber.

9. The combination fire pit and grill of claim 1 wherein the removable lid further comprises a handle.

10. The combination fire pit and grill of claim 1 wherein the lower fire chamber further comprises a plurality of bottom lid supports for positioning and supporting the bottom closure panel over the partially open bottom of the lower fire chamber.

11. The combination fire pit and grill of claim 10 wherein the lower fire chamber further comprises a plurality of latch mechanisms for securing the bottom closure panel in place.

12. The combination fire pit and grill of claim 1 wherein the lower fire chamber further comprises a plurality of first grill panel supports for positioning and supporting the first grill panel over the partially open top of the lower fire chamber.

13. The combination fire pit and grill of claim 1 wherein the lower fire chamber, in combination with the upper fire chamber, further comprises a plurality of latch mechanisms for securing the upper fire chamber to the lower fire chamber over the first grill panel positioned on the lower fire chamber.

14. The combination fire pit and grill of claim 1 wherein the upper fire chamber further comprises a plurality of second grill panel supports for positioning and supporting the second grill panel over the generally open top of the upper fire chamber.

15. The combination fire pit and grill of claim 14 wherein the upper fire chamber, in combination with the removable lid, further comprises a plurality of latch mechanisms for securing the removable lid to the upper fire chamber over the second grill panel positioned on the upper fire chamber.

16. The combination fire pit and grill of claim 1 wherein the upper and lower fire chambers, the bottom closure panel, and the removable lid, are constructed of heavy gauge steel.

* * * * *